(12) United States Patent
Williams et al.

(10) Patent No.: US 10,142,673 B2
(45) Date of Patent: *Nov. 27, 2018

(54) ACCESSING PROGRAMS USING NETWORKED DIGITAL VIDEO RECORDING DEVICES

(71) Applicant: THE DIRECTV GROUP, INC., El Segundo, CA (US)

(72) Inventors: M. Kent Williams, Palo Alto, CA (US); Robert N. Lee, Fremont, CA (US); Bruce A. Garcia, San Jose, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/418,053

(22) Filed: Jan. 27, 2017

(65) Prior Publication Data

US 2017/0142475 A1    May 18, 2017

Related U.S. Application Data

(63) Continuation of application No. 10/124,190, filed on Apr. 16, 2002, now Pat. No. 9,602,862.

(Continued)

(51) Int. Cl.
*H04N 7/18*    (2006.01)
*H04N 7/173*    (2011.01)
(Continued)

(52) U.S. Cl.
CPC ..... *H04N 21/4325* (2013.01); *H04N 21/4147* (2013.01); *H04N 21/436* (2013.01); *H04N 21/4821* (2013.01); *H04N 21/84* (2013.01)

(58) Field of Classification Search
USPC .................................................. 725/37–104
See application file for complete search history.

(56) References Cited

U.S. PATENT DOCUMENTS 4,485,219 A    11/1984   Falk et al.
5,193,208 A     3/1993   Yokota et al.
(Continued)

FOREIGN PATENT DOCUMENTS

AU        694568 B2     7/1998
DE      19939410 A1     3/2001
(Continued)

OTHER PUBLICATIONS

Gotuit Video Slide Show, http://www.gotuit.com/slides/slide1.htm, printed Jun. 13, 2002.

(Continued)

*Primary Examiner* — Mushfikh Alam
(74) *Attorney, Agent, or Firm* — Guntin & Gust, PLC; Atanu Das

(57) ABSTRACT

Access to programs using network connected digital video recording devices is disclosed. A DVR causes display of a content guide including a unit identification area. When the unit identification area is updated, the content guide also updates to reflect programs available on the currently selected DVR. The content guide of a remotely connected DVR can thus be displayed, from which programs are selected for playback. Playback can be resumed from a point at which a viewer terminated viewing, either at the local or remote location, or from the beginning of the program.

18 Claims, 14 Drawing Sheets

Related U.S. Application Data

(60) Provisional application No. 60/313,544, filed on Aug. 19, 2001.

(51) Int. Cl.

| | | |
|---|---|---|
| *H04N 5/932* | (2006.01) | |
| *H04N 5/935* | (2006.01) | |
| *H04N 5/76* | (2006.01) | |
| *H04N 21/432* | (2011.01) | |
| *H04N 21/4147* | (2011.01) | |
| *H04N 21/482* | (2011.01) | |
| *H04N 21/436* | (2011.01) | |
| *H04N 21/84* | (2011.01) | |

(56) References Cited

U.S. PATENT DOCUMENTS

| | | | | |
|---|---|---|---|---|
| 5,333,091 | A | 7/1994 | McFarland et al. | |
| 5,455,630 | A | 10/1995 | McFarland et al. | |
| 5,485,219 | A | 1/1996 | Woo et al. | |
| 5,532,735 | A | 7/1996 | Biahut et al. | |
| 5,600,366 | A | 2/1997 | Schulman | |
| 5,652,615 | A | 7/1997 | Bryant et al. | |
| 5,661,516 | A | 8/1997 | Carles | |
| 5,664,948 | A | 9/1997 | Park et al. | |
| 5,692,093 | A | 11/1997 | Debs et al. | |
| 5,696,866 | A | 12/1997 | McFarland et al. | |
| 5,724,472 | A | 3/1998 | Abecassis et al. | |
| 5,790,423 | A | 8/1998 | Lau et al. | |
| 5,793,366 | A | 8/1998 | Proehl et al. | |
| 5,818,439 | A * | 10/1998 | Nagasaka | G06F 17/30793 348/E7.073 |
| 5,848,397 | A | 12/1998 | McAuliffe et al. | |
| 5,878,222 | A * | 3/1999 | Harrison | H04N 5/4401 725/139 |
| 5,883,621 | A | 3/1999 | Iwamura et al. | |
| 5,886,731 | A | 3/1999 | Ebisawa et al. | |
| 5,892,536 | A | 4/1999 | Logan et al. | |
| 5,900,904 | A | 5/1999 | Okada et al. | |
| 5,986,692 | A | 11/1999 | Logan et al. | |
| 5,987,210 | A | 11/1999 | McFarland et al. | |
| 5,995,092 | A | 11/1999 | Yuen et al. | |
| 5,999,688 | A | 12/1999 | McFarland et al. | |
| 6,005,861 | A | 12/1999 | Humpleman | |
| 6,055,560 | A | 4/2000 | Mills et al. | |
| 6,147,714 | A | 11/2000 | Terasawa et al. | |
| 6,166,730 | A * | 12/2000 | Goode | H04N 7/17336 348/E7.073 |
| 6,177,931 | B1 | 1/2001 | Alexander | |
| 6,215,526 | B1 | 4/2001 | Barton et al. | |
| 6,226,444 | B1 | 5/2001 | Goldschmidt Iki et al. | |
| 6,233,389 | B1 | 5/2001 | Barton et al. | |
| 6,262,722 | B1 | 7/2001 | Allison et al. | |
| 6,269,394 | B1 | 7/2001 | Kenner et al. | |
| 6,288,716 | B1 | 9/2001 | Humpleman et al. | |
| 6,310,886 | B1 | 10/2001 | Barton et al. | |
| 6,324,338 | B1 | 11/2001 | Wood et al. | |
| 6,327,418 | B1 | 12/2001 | Barton et al. | |
| 6,351,270 | B1 | 2/2002 | Nishikawa et al. | |
| 6,360,053 | B1 | 3/2002 | Wood et al. | |
| 6,396,546 | B1 | 5/2002 | Alten et al. | |
| 6,456,308 | B1 | 9/2002 | Agranat et al. | |
| 6,477,705 | B1 | 11/2002 | Leung et al. | |
| 6,480,889 | B1 | 11/2002 | Saito et al. | |
| 6,481,010 | B2 | 11/2002 | Chow et al. | |
| 6,483,548 | B1 | 11/2002 | Allport et al. | |
| 6,507,951 | B1 | 1/2003 | Wugofski et al. | |
| 6,564,380 | B1 | 5/2003 | Murphy | |
| 6,642,939 | B1 | 11/2003 | Vallone et al. | |
| 6,661,468 | B2 | 12/2003 | Alten et al. | |
| 6,671,454 | B1 | 12/2003 | Kaneko et al. | |
| 6,732,372 | B2 | 5/2004 | Tomita et al. | |
| 6,757,906 | B1 | 6/2004 | Look | |
| 6,760,916 | B2 | 7/2004 | Hotz | |
| 6,760,918 | B2 | 7/2004 | Rodriquez | |
| 6,772,433 | B1 | 8/2004 | Lajoie et al. | |
| 6,832,385 | B2 | 12/2004 | Young et al. | |
| 6,839,769 | B2 | 1/2005 | Needham et al. | |
| 6,870,570 | B1 | 3/2005 | Bowser | |
| 6,922,845 | B2 | 7/2005 | Yap et al. | |
| 7,066,778 | B2 | 6/2006 | Kretzschmar et al. | |
| 7,080,400 | B1 * | 7/2006 | Navar | H04N 7/17336 348/E7.073 |
| 7,103,906 | B1 * | 9/2006 | Katz | H04N 7/17318 348/E7.071 |
| 7,127,735 | B1 * | 10/2006 | Lee | H04N 7/17336 348/E7.073 |
| 7,143,353 | B2 | 11/2006 | Dimitrova et al. | |
| 7,171,677 | B1 | 1/2007 | Ochiai et al. | |
| 7,194,755 | B1 | 3/2007 | Nakata et al. | |
| 7,277,870 | B2 | 10/2007 | Mourad et al. | |
| 7,486,648 | B1 | 2/2009 | Baranowski et al. | |
| 7,627,889 | B2 | 12/2009 | Jaff et al. | |
| 7,644,427 | B1 * | 1/2010 | Horvitz | H04H 60/37 725/13 |
| 7,801,942 | B2 * | 9/2010 | Caruso | G06F 17/30864 709/200 |
| 7,917,008 | B1 | 3/2011 | Lee et al. | |
| 8,060,903 | B1 | 11/2011 | Harvey et al. | |
| 2001/0013128 | A1 | 8/2001 | Hagai et al. | |
| 2001/0014891 | A1 | 8/2001 | Hoffert et al. | |
| 2001/0028782 | A1 | 10/2001 | Ohno et al. | |
| 2001/0054026 | A1 | 12/2001 | Choate et al. | |
| 2002/0016969 | A1 * | 2/2002 | Kimble | H04N 21/47202 725/87 |
| 2002/0065676 | A1 | 5/2002 | Grainger et al. | |
| 2002/0069218 | A1 * | 6/2002 | Sull | G06F 17/30796 715/202 |
| 2002/0087661 | A1 | 7/2002 | Matichuk et al. | |
| 2002/0092021 | A1 | 7/2002 | Yap et al. | |
| 2002/0092022 | A1 | 7/2002 | Dudkicwicz et al. | |
| 2002/0133821 | A1 | 9/2002 | Shteyn et al. | |
| 2002/0144275 | A1 | 10/2002 | Kay et al. | |
| 2002/0154892 | A1 | 10/2002 | Hoshen et al. | |
| 2002/0162109 | A1 | 10/2002 | Shteyn | |
| 2002/0174430 | A1 * | 11/2002 | Ellis | G11B 27/005 725/46 |
| 2002/0174444 | A1 | 11/2002 | Gatto et al. | |
| 2002/0178232 | A1 | 11/2002 | Ferguson et al. | |
| 2003/0005447 | A1 * | 1/2003 | Rodriguez | H04N 7/17318 725/51 |
| 2003/0093792 | A1 | 5/2003 | Labeeb et al. | |
| 2003/0095791 | A1 | 5/2003 | Barton et al. | |
| 2003/0101459 | A1 | 5/2003 | Edson et al. | |
| 2003/0106062 | A1 | 6/2003 | Shteyn et al. | |
| 2003/0126598 | A1 | 7/2003 | Agnihotri et al. | |
| 2003/0167473 | A1 | 9/2003 | Klosterman et al. | |
| 2004/0045020 | A1 | 3/2004 | Witt et al. | |
| 2004/0083273 | A1 | 4/2004 | Madison et al. | |
| 2004/0128317 | A1 | 7/2004 | Sull et al. | |
| 2004/0128685 | A1 * | 7/2004 | Hassell | H04N 21/8456 725/40 |
| 2004/0158856 | A1 | 8/2004 | Grooters et al. | |
| 2005/0028206 | A1 | 2/2005 | Cameron et al. | |
| 2005/0028208 | A1 * | 2/2005 | Ellis | H04N 7/163 725/58 |
| 2005/0154681 | A1 | 7/2005 | Schmelzer et al. | |
| 2005/0193414 | A1 * | 9/2005 | Horvitz | H04N 21/482 725/46 |
| 2005/0216942 | A1 | 9/2005 | Barton et al. | |
| 2005/0240295 | A1 | 10/2005 | Vilcauskas et al. | |
| 2005/0251827 | A1 * | 11/2005 | Ellis | H04N 5/44543 725/47 |
| 2005/0273819 | A1 | 12/2005 | Knudson et al. | |
| 2005/0273827 | A1 | 12/2005 | Javed et al. | |
| 2005/0283810 | A1 | 12/2005 | Ellis et al. | |
| 2006/0085821 | A9 | 4/2006 | Simmons et al. | |
| 2007/0136445 | A1 | 6/2007 | Sweatt et al. | |
| 2007/0157281 | A1 * | 7/2007 | Ellis | H04N 7/17309 725/134 |
| 2007/0282819 | A1 | 12/2007 | Lynn et al. | |
| 2008/0086751 | A1 | 4/2008 | Horn et al. | |

(56) References Cited

U.S. PATENT DOCUMENTS

| | | |
|---|---|---|
| 2009/0030978 A1 | 1/2009 | Johnson et al. |
| 2009/0193451 A1 | 7/2009 | O'Neil et al. |
| 2011/0033166 A1* | 2/2011 | Barton .................. H04N 5/765 386/201 |
| 2014/0068671 A1* | 3/2014 | Boyer .................. G06Q 10/109 725/40 |
| 2017/0013318 A1 | 1/2017 | Williams et al. |

FOREIGN PATENT DOCUMENTS

| | | |
|---|---|---|
| EP | 0693215 B1 | 11/1998 |
| EP | 1071287 A1 | 1/2001 |
| JP | 07-021619 | 1/1995 |
| WO | 9904561 A1 | 1/1999 |
| WO | 9952279 A1 | 10/1999 |
| WO | 9952285 A1 | 10/1999 |
| WO | 0007368 A1 | 2/2000 |
| WO | 0018108 A2 | 3/2000 |
| WO | 0028736 A1 | 5/2000 |
| WO | 200044171 | 7/2000 |
| WO | 200056072 | 9/2000 |
| WO | 0058833 A1 | 10/2000 |
| WO | 0058834 A1 | 10/2000 |
| WO | 0058967 A1 | 10/2000 |
| WO | 0059214 A1 | 10/2000 |
| WO | 0062298 A1 | 10/2000 |
| WO | 0062299 A1 | 10/2000 |
| WO | 0062533 A1 | 10/2000 |
| WO | 0067475 A1 | 11/2000 |
| WO | 0106370 A1 | 1/2001 |
| WO | 0122729 A1 | 3/2001 |
| WO | 0146843 A2 | 6/2001 |
| WO | 0147238 A2 | 6/2001 |
| WO | 0147279 A2 | 6/2001 |
| WO | 0165762 A2 | 9/2001 |
| WO | 0165862 A2 | 9/2001 |
| WO | 200176249 | 10/2001 |
| WO | 0189203 A2 | 11/2001 |
| WO | 0147249 B1 | 2/2002 |
| WO | 2004084448 A2 | 9/2004 |

OTHER PUBLICATIONS

Office Action dated Aug. 10, 2005, for U.S. Appl. No. 10/124,583.
Office Action dated Aug. 17, 2007, for U.S. Appl. No. 10/124,583.
Office Action dated Dec. 5, 2007, for U.S. Appl. No. 10/124,064.
Office Action dated Jul. 2, 2007, for U.S. Appl. No. 10/215,904.
Office Action dated May 16, 2006, for U.S. Appl. No. 10/124,583.
Office Action dated Oct. 6, 2004, for U.S. Appl. No. 10/124,506.
Sonicblue Incorporated, ReplayTV 5000 User's Guide, 2002.
TiVo Viewer's Guide, TiVo Inc., Alviso, CA, 2002.
U.S. Appl. No. 10/124,064.
U.S. Appl. No. 10/124,506.
U.S. Appl. No. 10/124,583.
U.S. Appl. No. 10/215,904.
USPTO, Final office action, U.S. Appl. No. 10/124,064, dated Dec. 24, 2009.
USPTO, Final office action, U.S. Appl. No. 10/124,064, dated May 29, 2008.
USPTO, Final office action, U.S. Appl. No. 10/124,583, dated Apr. 20, 2011.
USPTO, Final office action, U.S. Appl. No. 10/124,583, dated Feb. 20, 2008.
USPTO, Final office action, U.S. Appl. No. 10/124,583, dated Mar. 31, 2010.
USPTO, Final office action, U.S. Appl. No. 10/215,904, dated Apr. 10, 2008.
USPTO, Final office action, U.S. Appl. No. 10/215,904, dated Apr. 27, 2010.
USPTO, Non-final office action, U.S. Appl. No. 10/124,064, dated Dec. 12, 2008.
USPTO, Non-final office action, U.S. Appl. No. 10/124,064, dated Jun. 4, 2010.
USPTO, Non-final office action, U.S. Appl. No. 10/124,064, dated May 27, 2009.
USPTO, Non-final office action, U.S. Appl. No. 10/124,583, dated Jul. 30, 2009.
USPTO, Non-final office action, U.S. Appl. No. 10/124,583, dated Oct. 26, 2010.
USPTO, Non-final office action, U.S. Appl. No. 10/215,904, dated Aug. 6, 2008.
USPTO, Non-final office action, U.S. Appl. No. 10/215,904, dated Dec. 7, 2010.
USPTO, Non-final office action, U.S. Appl. No. 10/215,904, dated Feb. 3, 2009.
USPTO, Non-final office action, U.S. Appl. No. 10/215,904, dated Sep. 2, 2009.
USPTO, Notice of Allowance, U.S. Appl. No. 10/124,064, dated Feb. 22, 2011.
World Intellectual Property Organization, International Search Report and Written Opinion, PCT/ US04/08891, dated Jul. 25, 2008.
World Intellectual Property Organization, International Search Report, PCT/US2004/008632, dated May 15, 2007.
Barton, James , U.S. Appl. No. 60/186,551, Downloading movies to Lots of People, Mar. 2, 2000.

* cited by examiner

ACCESSING PROGRAMS USING NETWORKED DIGITAL VIDEO RECORDING DEVICES

CROSS-REFERENCE TO RELATED APPLICATION(S)

This application is a continuation of U.S. patent application Ser. No. 10/124,190 filed Apr. 16, 2002 by M. Kent Williams et al., claims the benefit of priority to U.S. Provisional Application No. 60/313,544 filed on Aug. 19, 2001. All sections of the aforementioned application(s) are incorporated herein by reference in its entirety.

DESCRIPTION OF THE RELATED ART

Digital video recorders record broadcast and other content for subsequent playback and other operations. Users of these devices often navigate a channel guide listing programs that are or will be broadcasted. Selected programs from these listings are scheduled for recording.

When a program becomes available it is recorded by storing a file corresponding to the program on a hard disk. Recorded program listings can be provided in a content guide separate from the channel guide—this type of content guide may be referred to as a playback guide.

It can be difficult to manage the increasing amount of available programming. Conventional "flat format" content guides that simply list all available programs are undesirable as navigation is very cumbersome and confusing. The number of options can overwhelm a user, or at least prevent the user from fully enjoying all available content. Some channel guides include a separately navigable category space. With these types of guides, a category button on a remote control is pressed, and then a number of selectable categories appear on the display.

Selection of one of the categories prompts yet another display, typically a grid corresponding to the selected category. While there is some benefit to providing a category option, it is still quite cumbersome to find appropriate buttons on the remote control, navigate to a selection screen, and then select a category. A "favorites" button can also be used. This functionality allows users to designate channels under one or more favorites headings. This is also somewhat helpful, but is directed at channels, rather than programs. Further, the general guide, category and favorites options basically operate as separate guides. Each of the options requires separate controls, displays and navigation to view available content.

Many modern households also have several televisions. There are many problems associated with this, particularly where a lot of programming is managed. For one, the organizational efforts of a user are confined to the television set, or corresponding set top box that they configure. That is, if they customize the guide for a particular set, those settings are restricted to that set, and unavailable to other sets in the household. Additionally, a user viewing a program in one room might want to watch the end of the program in another room. Conventional set top boxes work solely in conjunction with the television to which they are locally attached. Thus, there remains a need for improved content management, particularly with systems involving multiple display devices in different locations.

SUMMARY OF THE INVENTION

The described embodiments of the present invention facilitate improved navigation among and processing of content available through number of network connected digital video recording devices.

In one aspect, embodiments of the present invention allow access to programs using digital video recording devices connected in a local area network, particularly allowing one local device to access the programming on another digital video recording device remotely connected to it through the network. It also provides such access through a common guide that eases users' navigation of available content throughout the network. The digital video recording device (DVR) provides signals for displaying a content guide on a local display. This content guide includes a content area that lists a first set of programs that are stored in the DVR and that are selectable for viewing on the local display. The DVR is also configured to receive a request to update the content area to display a second set of programs stored in another DVR that is remotely connected to it through the a network, and to then display the second set of programs in the content area. Upon navigation to such a display, a user can provide a command to play a selected program chosen from the second set of programs, whereupon the DVR accesses the selected program from the remote DVR and provides signals for playing the selected program on the local display.

In addition to accessing programs that are stored on remote DVRs, embodiments of the present invention allow a user to pause a program on one DVR and then to view the program in another DVR, with the opportunity to resume a viewing of the program at the point that the viewing of the program on the remote DVR terminated. For example, a user may be viewing a selected program on a first DVR located in one room in their household, and may then either command the first DVR to pause or stop the selected program. The user can subsequently access the selected program from a second DVR, and resume their viewing of the selected program from the pause or stop location.

In another aspect, the content guide includes a unit identification area that identifies a current digital video recording device. This can be in the form of a spinner that can cycle through each DVR in the network, which is updated using conventional remote control signals.

When the unit identification area is updated, the remainder of the content guide automatically updates to reflect content stored on another DVR. Specifically, if the unit identification area indicates a local DVR, the user can navigate to the area and change the indication to a remote DVR, whereupon the remainder of the content guide updates to display programs that are available on the remote DVR. Preferably, DVRs are identified according to user programmable labels that are displayed in the unit identification area, allowing users to name their units according to the names of the rooms in their household, or to pick any arbitrary name for their various networked units.

The present invention can be embodied as methods, apparatus, systems and computer program products for accessing programs using networked digital video recording devices.

BRIEF DESCRIPTION OF THE DRAWINGS

These and other more detailed and specific features of the present invention are more fully disclosed in the following specification, reference being had to the accompanying drawings, in which.

DETAILED DESCRIPTION

Figure 1:
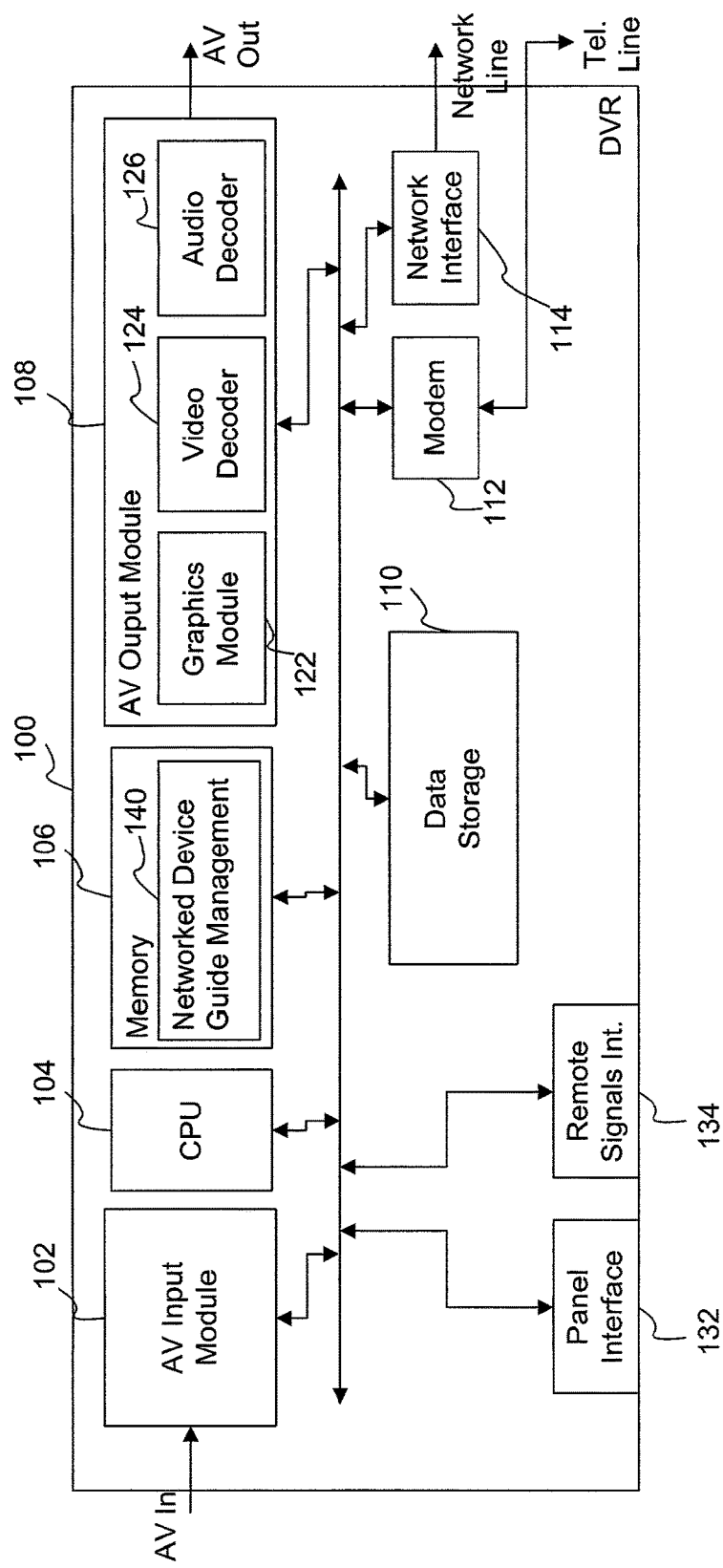
FIG. 1 is a block diagram of a digital video recorder (DVR) configured to include guide management in accordance with the present invention.

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention. The block diagram of FIG. 1 illustrates a DVR 100 configured to include management of content among multiple networked units in accordance with the present invention. The DVR 100 includes an AV input module 102, CPU 104, memory 106, AV Output module 108, data storage medium 110, modem 112 and network interface 114 interconnected by a conventional bus architecture. Generally, the CPU 104 executes instructions such as those stored in memory 108 to provide functionality including that provided by certain embodiments of the present invention. Additional memory such as ROM and/or EEPROM (not shown) may store instructions for boot up sequences, DVR functionality updates, or other information. The network interface 114 is conventional and preferably allows connection to an Ethernet based network. This connection may be used to connect to a home network and in turn a broadband connection to a WAN such as the Internet or any of various alternative broadband connections. In addition to traditional broadcast and other input AV signals, the broadband connection may also source content that is recorded and played in accordance with the present invention.

The user controls the operation of the DVR 100 through control signals initiated from the exterior of the DVR 100 housing through the panel interface 132, or through control signals originating from a remote control, which are received through the remote signals interface 134, in conventional fashion.

The AV input module 102 receives input through various conventional interfaces, including coaxial RF/Ant, S-Video, network interfaces, and others, which need not be shown for an understanding of this invention. The received signals can originate from standard NTSC broadcast, high definition (HDTV) broadcast, standard cable, digital cable, satellite, Internet, or other sources, with the AV input module 102 being configured to include appropriate conventional tuning and/or decoding functionality. The DVR 100 may also receive input from other intermediary devices, such as a set top box that receives one signal format and outputs an NTSC signal or some other conventional format.

The AV input module 102 also preferably includes one or more MPEG encoding modules that convert signals from a first format (e.g. analog NTSC format) into an MPEG format (e.g. MPEG 2, etc.) that may be stored in the memory 108 or data storage medium 110 such as a hard disk. Where necessary, an inbound signal may be converted to an intermediate format prior to MPEG encoding. For example, a digital signal may be intermediately converted to an NTSC signal that is ultimately MPEG encoded. The artisan will recognize the alternatives. Typically, content corresponding to the formatted data stored in the data storage medium 110 may be viewed immediately, or at a later time. Additional information may be stored in association with the MPEG data to manage and identify the stored programs.

The AV output module 108 further includes a graphics module 122, video decoder 124 and audio decoder 126. The video decoder 124 and audio decoder 126 are preferably MPEG decoders that can obtain the MPEG data stored in the data storage medium 110 and convert it to format compatible with the display device, typically the NTSC format that can be readily received by a conventional television set. The graphics module 122 receives various guide and control information and provides signals for corresponding displays, outputting them in a compatible format.

The DVR 100 processes guide information that describes and allows navigation among content receivable by a system (e.g. the broadcast system) at present or future times, as well as content that has already been recorded by the DVR 100. Guides that display such information may generally be referred to as content guides. These content guides include channel guides and playback guides. A channel guide displays a group of programs or other content from which individual selections for current or future recording and viewing are made. In a specific case, the channel guide lists numerous broadcast television programs. The playback guide displays content that is stored or scheduled to be stored by the DVR 100. Other terminology may be used for the guides. For example, they may be referred to as programming guides or the like. The term content guide is intended to cover all of these alternatives. The DVR 100 may also be referred to as a Personal Video Recorder (PVR). One example of a DVR 100 that may incorporate embodiments of the present invention is the ReplayTV brand of DVRs provided by SONICblue Incorporated, a Santa Clara, Calif. company. A Replay Guide is an example of a playback guide implemented by ReplayTV DVRs.

Although certain modular components of a DVR 100 are shown in FIG. 1, the present invention also contemplates and encompasses units having different features. For example, some devices may omit features the telephone line modem, instead using alternative conduits to acquire guide data or other information used in practicing the present invention.

Additionally, some devices may add features such as a conditional access module (CAM), such as one implementing smart card technology, which may work in conjunction with certain content providers or broadcasters to restrict access to content.

Additionally, although this embodiment and other embodiments of the present invention are described in connection with a DVR or PVR, the invention is equally applicable to other devices including but not limited to a set top box (STB), cable STB, satellite STB, or televisions with similar functionality.

Figure 2:
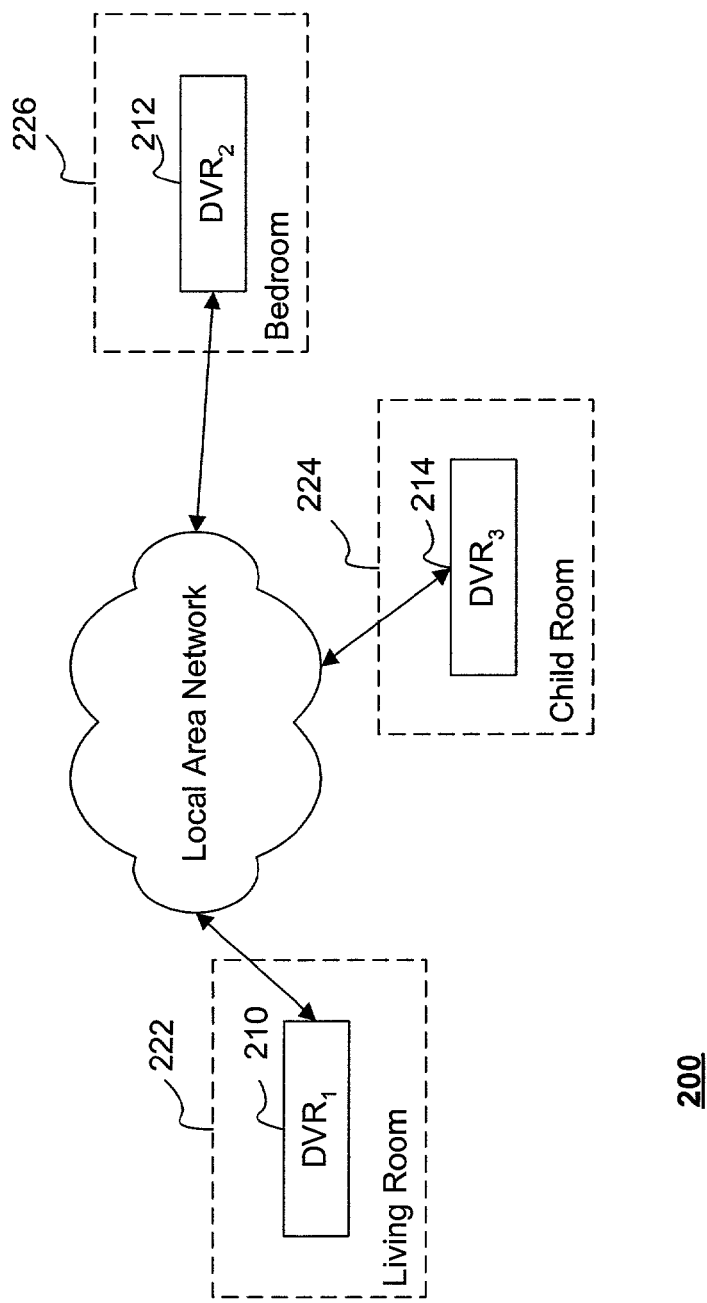
FIGS. 2 and 3 are schematic diagrams illustrating examples of systems in which a so configured DVR operates.

Although the DVR 100 may operate as a stand-alone unit that, it preferably operates along with other units in various types of networks or the like. FIG. 2 illustrates an example of a system 200 in which several DVRs 210-214 are interconnected in a local area network.

Particularly, a home network is shown to include a living room $DVR_1$ 210, a bedroom $DVR_2$ 212 and a child room $DVR_3$ 214. Conventional network technology and software may be used to generally allow the units to communicate with each other, such as through the above described network interface. The network arrangement allows remote operations and interchanges between units, and provides a conduit through which programming is provided to the units. Particularly, for example, a bedroom $DVR_2$ 212 may connect to a living room $DVR_1$ 210 through the network to view its content guide, and can be operated to play selected programming that is stored therein. Each DVR can have an associated human readable name selectable from a default list or obtained through conventional alphanumeric interfaces. Each DVR will have the capability of communicating their name and IP address to other units in the network. This can be variously accomplished, such as by broadcasting the information to the units as part of a boot up sequence. The user can also name each unit, and can identify the other units in the network as part of a set up operation. The functionality of accessing programs found on networked units and playing such programs through remote connections is described further below.

Figure 3:
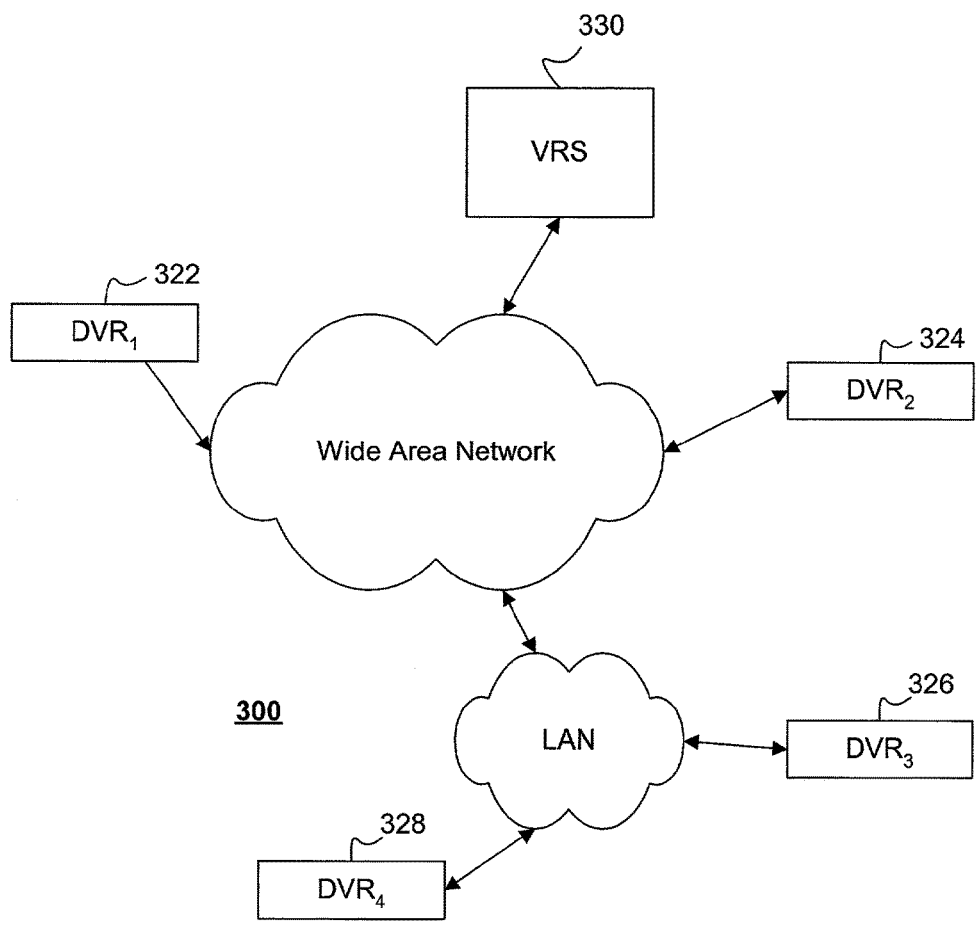

FIG. 3 illustrates another example of a system 300 in which several DVRs 322-328 are variously connected to a LAN and a wide area network (WAN), such as the Internet.

Particularly, a $DVR_3$ 326 and another $DVR_4$ 328 are shown connected to a LAN, such as that described in connection with FIG. 2. The units in the LAN may in turn be connected to the WAN, so that they can communicate with other DVRs 322, 324 or a server 330. Again, conventional networking technologies may be used to facilitate the communications among the units. For example, the network communications may implement the Transmission Control Protocol/Internet Protocol (TCP/IP), and additional conventional higher-level protocols, such as the Hyper Text Transfer Protocol (HTTP) or File Transfer Protocol (FTP).

Referring again to FIG. 1, the DVR memory 106 also includes an embodiment of a networked device guide management module 140 (NDGMM 140), which generally provides content guide functionality, plus management of content residing in multiple networked devices in accordance with the present invention.

In general operation, the NDGMM 140 provides a content guide display having a content area, and concurrently displayed categories and unit identification areas. A user navigates among available categories, and the content area lists programs available in a currently selected category. The content guide is navigable using conventional remote control signals, including those that provide directional navigation, such as by arrows or trackball, joystick or the like. The categories are listed as a series of tabular selections that reside in a row above the program listings in the content area. Directional navigation causes a cursor to reside over the various categories. The display also scrolls to allow previously un-displayed categories to be viewed. The content area updates to display programs listed in the currently selected category.

Conventional remote control signals can be used to navigate among the titles in the content area. Other navigational tools such as those that allow entry of alphanumeric characters to immediately jump to an entry can be provided.

The present invention also contemplates a "telephone keypad" functionality, wherein entering keypad numbers causes the cursor to quickly jump to corresponding entries. For example, the numbers "1" and "0" would respectively prompt navigation to the top and bottom of the guide. Other numbers would prompt navigation to the first matching alphabetical entry found. For example, pressing the number "2" navigates to the next channel name in the guide that starts with the letter "A." It could then automatically navigate to "B" and "C" entries if there are no "A" (and then "B") entries. A single control signal such as that provided by a jump button can be used to cycle the cursor between the content, categories and unit identification areas. For example, when the cursor resides in the content area, pressing the jump button automatically moves the cursor to the categories area, whereupon operations as described above may select a new category. Similarly, pressing the jump button when the cursor resides in the categories area causes it to move to the unit identification area, wherein, for example, the DVRs in the user's home network are selected. The first instantiation of the content guide at a local unit will be for the local unit. However, the user may easily navigate to the content guide for another unit in their network by scrolling among the units found in the unit identification area. Selecting a new unit automatically updates the guide to reflect the content found on the other unit, but does so using a format (content area, categories area, unit identification area) that is identical or similar to that used on the local unit, which eases the user's understanding of the content available on the other units, and provides a seamless navigation experience. There are of course alternatives for the initial guide mode and the representation of content on remote devices. For example, the "last viewed" content guide (that corresponding to the last unit accessed, even if the DVR is turned off in the interim) can be the default first instantiation in lieu of the guide for the local unit. Still further, the user can be prompted to configure the default guide characteristics to select what the initial default guide would be. Also, entries for content available from remote units may be colored differently from that on the local unit, while being in the same general format. This would allow the user to recognize and distinguish remotely and locally available content, while keeping a familiar layout and presentation of the content.

The above described content and category areas are updated upon selection of a networked unit. For example, a user navigates to the unit identification area and selects the "Living Room" unit, whereupon the categories and programs of that unit are displayed as previously described, regardless of the user's location on the network. Where networked units are implemented, the above-described "jump" control signal also cycles through the unit identification area. That is, cursor jumps between the content area, categories area, and unit identification area as the relevant control is pressed. These and other control functionalities are described further below.

The NDGMM 140 also allows a user to assign programs to categories. For example, the user can designate an assigned category for a program when it is selected for recording. The designation can be to a predetermined category, or a custom category named by the user. This allows the user to name their own category and populate it according to their own standards. These custom categories appear in the categories area and can be selected as described above, whereupon the designated programs appear in the content area.

Further, the NDGMM 140 allows a user to establish criteria that is applied to a set of available programs to identify a subset of programs corresponding to the "theme" defined by the criteria. The user also designates a category for these programs, preferably when they establish or modify the criteria. This allows the user to control automatic population of a category with programs that do not need to be individually identified, and that do not need to have originated from a particular channel.

The programs that can be listed in the content guide extend beyond familiar television programs that are broadcast by television and cable television networks. For example, programs also include recordings of home videos, home photographs, duplicated versions of content previously purchased by a user in another form (e.g. a movie on a video cassette), or any content that can be recorded by the unit and which is then displayable as a "program" in the content guide.

Figure 4:
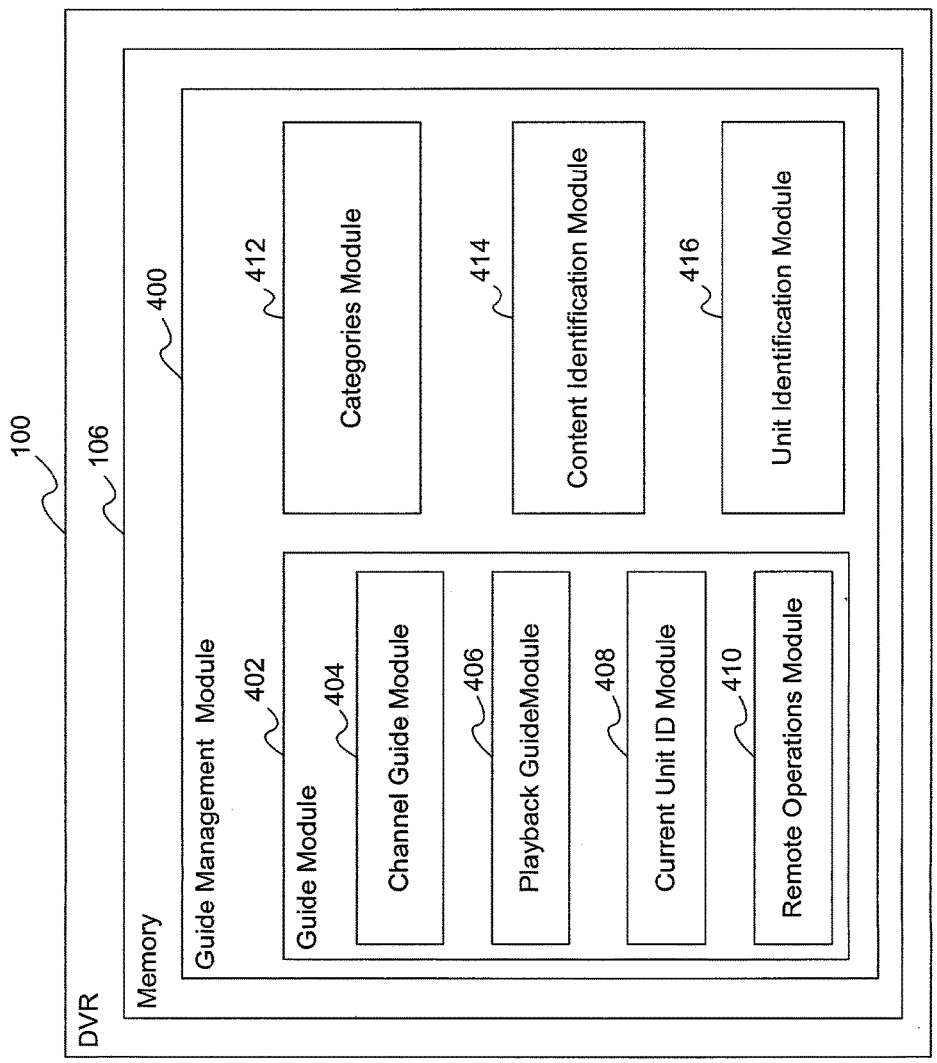
FIG. 4 is a block diagram illustrating an embodiment of a guide management module configured in accordance with the present invention.

The block diagram of FIG. 4 illustrates an embodiment of a networked device guide management module (NDGMM) 400 within a DVR 100 memory 106. The memory 106 includes a conventional engine (not shown) that provides the necessary framework and AP is on which applications and other software will operate. Although any conventional software may be supported, preferably the engine will support Extensible Markup Language (XML), and/or Hypertext Markup Language (HTML) applications and modules.

The functionality of navigating among available resources using the content guide of the present invention is preferably provided by software, although it may also be provided by hardware, firmware, or any combination thereof. Although the software may be variously modularized, such as by providing more or less software modules to provide the same overall functionality, FIG. 4 illustrates an example of a NDGMM 400 that includes a guide module 402, a categories module 412, a content identification module 414, and a unit identification module 416. Further, the guide module 402 includes a channel guide module 404, a playback guide module 406, a current unit identification module 408 and a remote operations module 410.

The guide module 402 includes routines for managing the display of the various guides. It provides the content guide format including its respective content, categories and unit 14 identification areas, as well as the functionality of navigating among and within the various areas. The channel guide module 404 and the playback guide module 406 respectively provide the remainder of the channel and replay types of content guides. Particularly, the channel guide includes programs that are or will become available for recording, and the playback guide includes programs that have been recorded or have been selected for recording.

The categories module 412 retains the list of available categories. Preferably, up to 16 categories can be listed, including default and custom user categories. The default categories can, for example be Family, Kids, Movies, News, Sports, and TV Shows. It also provides interfaces for introducing the names of new categories. The ordinarily skilled artisan will readily recognize the alternatives, including fewer or more overall and default categories. The content identification module 414 includes routines for identifying programs and providing corresponding interfaces. Preferably the content identification module identifies programs to be recorded, whether they are single, repeat or theme based recordings, and provides interfaces for assigning the recorded programs to a selected category. The unit identification module 416 identifies the local DVR and the other DVRs to which it is networked, and may be variously embodied, such as by a table identifying each device or unit, and associated information such as its current label, network address, and the like.

The current unit identification module 408 updates to reflect changes in the status of the guide module 402 according to user operation of the unit identification area of the content guide. If the local DVR is currently selected, then the guide module 402 for the local DVR is used to appropriately display the local guide. However, if another remote DVR is selected, such is reflected in the current unit identification module 408, and it causes the NDGMM 400 to query the NDGMM of the remote DVR through the network connection to retrieve the content guide of the remote DVR for local display. If the local DVR has previously retrieved the content guide of the remote DVR, it preferably retains a "cached" version of that guide so that it can immediately display it in response to the selection of the remote DVR guide. The cached version of the remote DVR content guide can then be refreshed in the background, whereupon the display can be updated to include the most current version of the remote DVR content guide available.

The remote operations module 410 communicates with the current unit identification module 408 and provides interfaces through which a user may access and play programs stored on the various networked units. The remote operations module also maintains and stores information that identifies the location at which a viewer interrupts viewing of a program. In one alternative, this information can comprise a list of pointers identifying temporal locations in programs that correspond to points at which a viewer interrupts viewing of a program. This list may also be persistently stored on the hard disk as part of routine operation or a shutdown sequence. If a user operates a local DVR to play a program and then issues a pause or stop command for the program, the remote operations module 410 updates the list to reflect the location at which the program was paused. This information may be maintained as an array, table, database or the like relating the file identifier for the program to a pointer corresponding to the termination point or location.

Another preferred way of storing information relating to users' interruptions of viewing enjoyment implements a "pointer" that does not point to a data location on a disk, but rather one that identifies the number of seconds into a video recording at which a user paused or otherwise stopped playback. With this type of pointer, retrieving the relevant file and proceeding to a playback position corresponding to the number of seconds can determine the playback position. The viewer would of course not have to wait the actual number of seconds; rather, the file could be rapidly processed in the background to arrive at the pause position. This aspect of the present invention is useful in that it allows a DVR to resume playback for a piece of content served from a remote unit without having to be concerned about the location on a remote disk corresponding to a traditional data pointer.

The single logical "guide data" for a particular local machine is stored in a set of files on the local disk. The set of files is updated whenever something in the guide changes. Changes could be storing a playback position when a show is paused (e.g., the pointer information described above), adding a new channel when the user sets up a record, deleting shows, and others. One aspect of the present invention implements a snapshot file for minimizing the amount of data that needs to be transmitted among units to share guides. After the local files are changed for the logical guide data, a snapshot is taken of the data to be exported for use by remote machines. The snapshot is a single file representing the logical guide data. The data includes information that identifies all of the programs or other content available, as well as information about the programs, and the above described information regarding user pauses, etc. Guide data is transferred to remote units via these snapshot files. The single snapshot file can be much more easily and efficiently transmitted between units. A locally operated DVR can thus receive a snapshot file from a remote DVR and use the snapshot file to display a guide that presents the content available from the remote DVR. The local DVR can also retain these snapshots for multiple remote units and call them up as requested, with periodic updates of the cached data, or updates based upon user requests, as needed. When a DVR "A" plays a show from DVR "B," it accesses a local copy of a snapshot for DVR B. If the user pauses the show on DVR A, this location at which viewing was interrupted is stored in the local guide data files, and correspondingly the local snapshot for DVR A. However, the snapshot for DVR B would preferably remain unchanged, so it could have a different pointer for a viewer pause/stop.

Figure 5A:
FIGS. 5A-5C are diagrams illustrating embodiments of a content guide configured in accordance with the present invention.

By retaining this information, when a user remotely accesses a program, the remote operations module 410 can query the corresponding remote operations module of the targeted DVR in order to retrieve the remote termination point, which allows, among other things, resumption of viewing a program that that had been previously paused in another location. For example, the respective snapshots for various networked DVRs can include the same program, but to each have a different "pause" location. The user can subsequently play the show back according to various options. These include playback from the beginning, from the location where it was last viewed on the local machine, or from where it was last viewed on any other DVR on the network. As described above, the software for providing networked device guide management may be variously modularized, such as by providing more or less software modules than those shown in FIG. 4. In one preferred alternative, applications including a channel guide module and a playback guide module each including remote operations client and service modules could be provided, and bound together by an applications management module "shell." A remote operations module and a unit identification module could also be provided outside the shell, but they would be callable by any software in the system. Remote operations would operate by calling the remote operations module, which defines protocols and handles communications between machines. Applications that want to communicate with other machines could create a module to provide support for making their particular remote function calls and a module for handling those requests as a service. The service side for an application would include defining and registering callbacks with the remote operations module. The client side for an application could provide a (e.g. C/C++) style function, within the application or public for other applications to call, that will map to a remote location. Such an alternative could provide the equivalent to the above described guide management module functionality without necessarily using the same terminology or modular breakdown. Again, the present invention is not limited by the modular breakdown or module naming terminology. The functionality of the NDGMM 400 is described further with reference to the display diagrams of FIGS. 5A-D and 8, and the flow diagrams of FIGS. 6A-B, 7, and 9A-B. FIG. 5A is a display diagram illustrating an embodiment of a content guide 500a configured in accordance with the present invention. More particularly, the content guide 500a is a playback guide that displays content that has been recorded or has been selected for recording. The illustrated content guide 500a includes a header 502, a heads up display (HUD) 504, a categories area with several category listings 506a-e, a content area with several listed programs 508a-f, and a unit identification area 510. The unit identification area 510 displays the name of the unit whose guide is being viewed. If the unit is a stand-alone (not networked with other units), then the unit identification area 510 can be omitted or can provided a fixed display such as a logo.

The header area 502 displays a currently selected category, here "TV Shows." The content area lists the available programs in the selected category, including the shown entries 508a-f. While in the content area, the user navigates among the available programs using conventional remote control and display signals such as a cursor that moves in response to directional commands and that either automatically selects the underlying entry or does so in response to a selection signal (e.g., a joystick input can provide various directional commands and be pressed to "select" a currently highlighted area). The list of programs may exceed the number that can be shown in the content area. Downward cursor navigation beyond the lowermost entry 508f causes un-displayed entries to appear, unless the last in the category. The HUD 504 displays additional information regarding a currently selected entry. Here, it displays recording quality and other information about the current program for entry 508d, "The Simpsons."

Figure 5B:
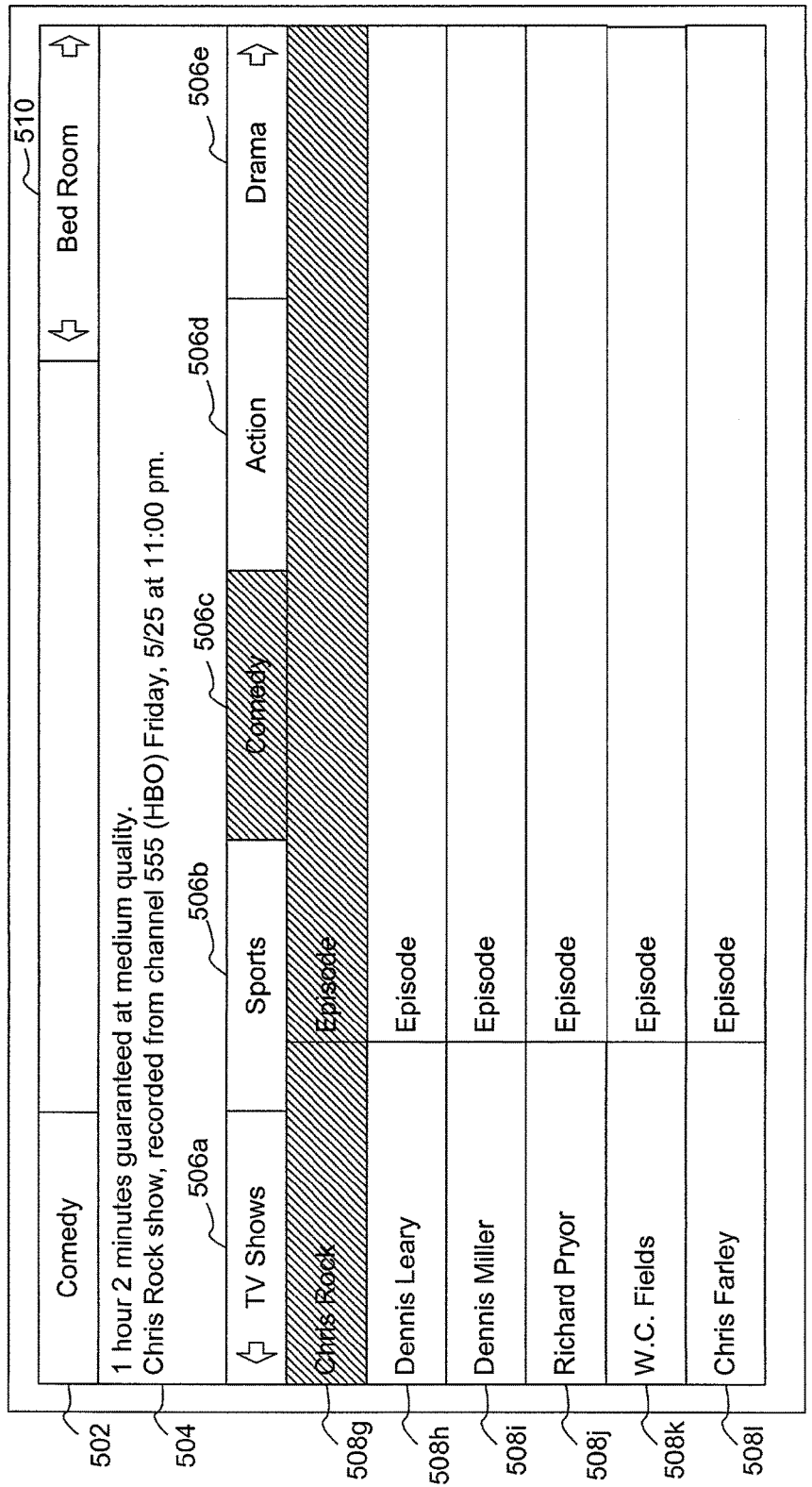

Navigation of the categories area allows selection of a new category and a corresponding update of the listed programs. Category 506a, "TV Shows" is selected in FIG. 5A, and the programs 508a-f in the category area all correspond to this category. FIG. 5B illustrates an updated content guide 500b wherein category 506c, "Comedy" has been selected. Selection is preferably automatic upon navigation of the cursor over the category entry. It can also require navigation over the entry plus pressing a button that selects the category, or various other alternatives that the artisan will readily recognize. Since "Comedy" is selected, the header 502 is updated accordingly, and the content area is updated to include programs 508g-1 corresponding to the selected category. A preferred default also highlights the uppermost entry in the content area for the selected category, which here is the program for entry 508g ("Chris Rock"). The HUD 504 also updates according to the highlighted program.

Figure 5C:
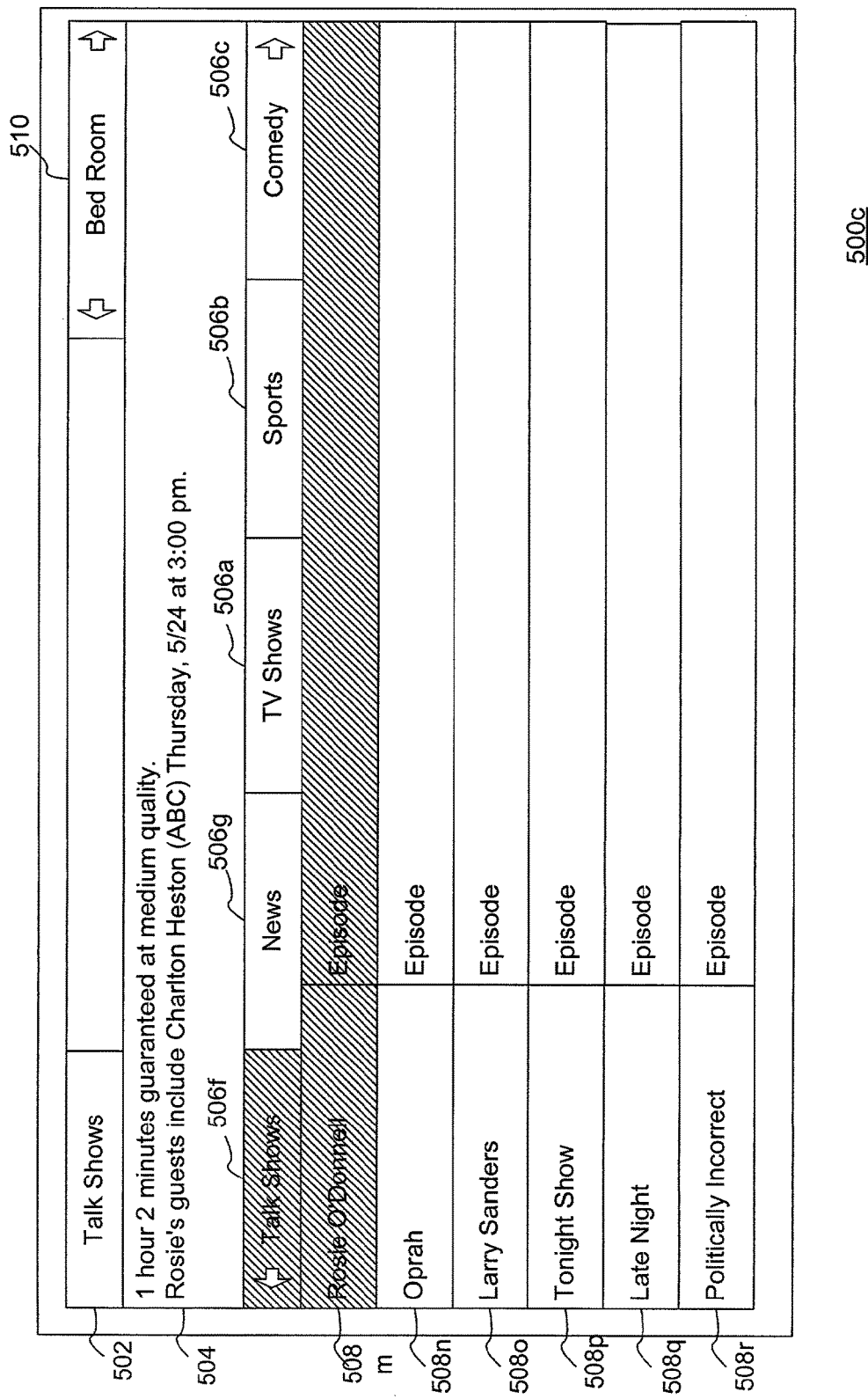

The number of categories may exceed the number that can be shown in the display space of the content guide. The category area is preferably scrollable to allow additional categories to be displayed. Navigation to the right while on the rightmost entry (506e in FIG. 5B), or to the left while on the leftmost entry (506a) causes corresponding additional entries to be displayed. Alternatively, pressing arrow buttons can cause the same response. FIG. 5C illustrates an updated content guide 500c after navigation to the left of entry 506a, "TV Shows." Two additional categories, 506f "Talk Shows" and 506g "News" appear. The cursor resides over category entry 506f, "Talk Shows," and the content area displays new corresponding programs 508m-r, with the uppermost entry, 508m, "Rosie O'Donnell" being highlighted.

Preferably, the categories "wrap around" so that one can navigate the category area without hitting a termination point. That is, if there are 7 total entries 506a-g, and the leftmost entry on display is the "first" entry 506a, then navigation to the left updates the category area to display the "last" entry 506g. The alternative of terminating navigation at an endpoint can of course also be provided.

Figure 5D:
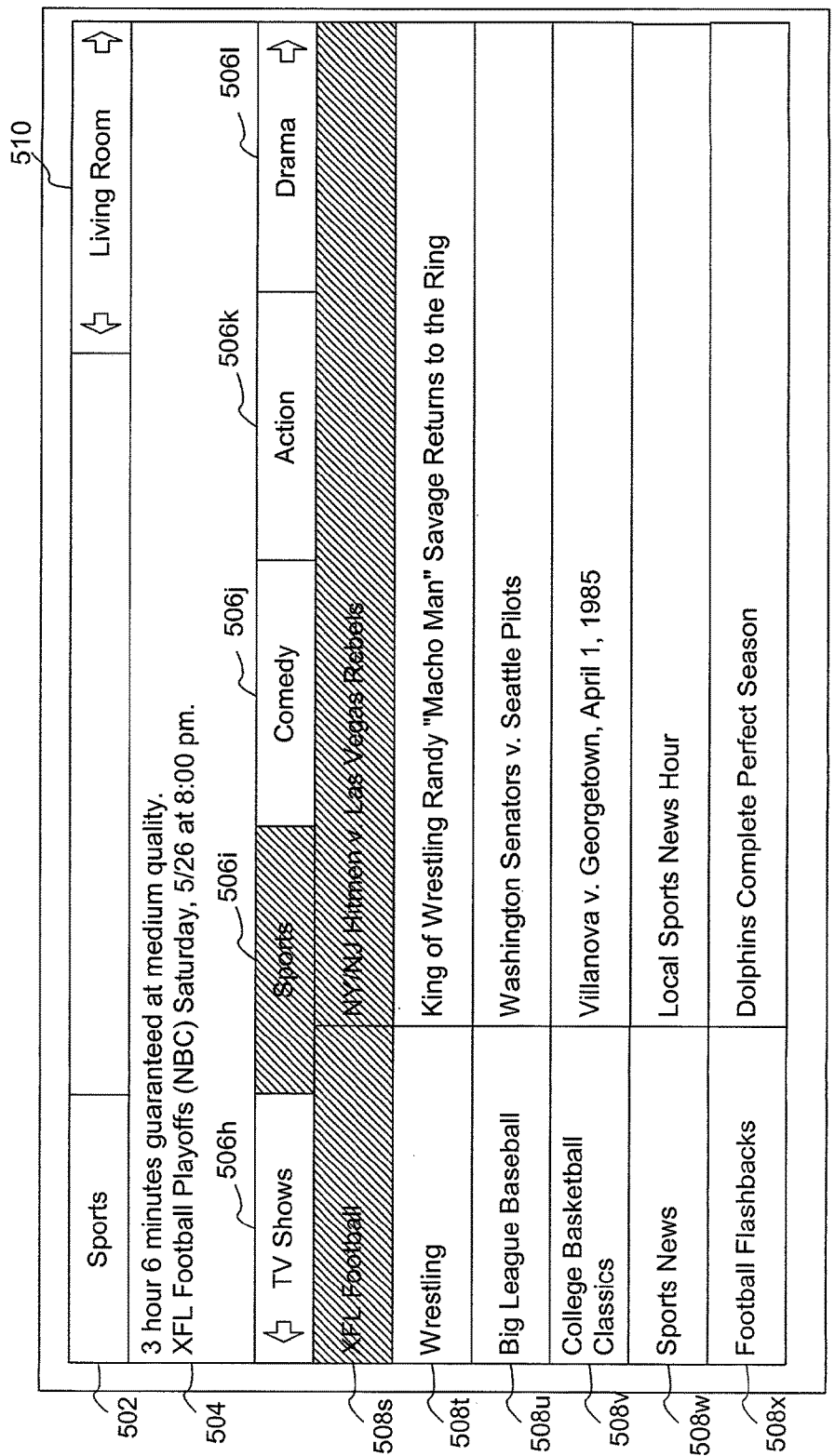
FIG. 5D-5E are diagrams illustrating embodiments of a content guide and corresponding display screen for providing operations among networked devices in accordance with the present invention.

FIG. 5D illustrates another updated content guide 500d after navigation to the unit identification area 510 and selection of the "Living Room" DVR as the current DVR. As indicated, upon such a selection the overall look of the content guide 500d remains the same, but the content area and categories area update to reflect the guide of the remote (here, Living Room) DVR. Particularly, the shown categories are updated to be TV Shows 506h, Sports 506i, Comedy 506j, Action 506k and Drama 506l, with Sports 506i being currently selected. The list of programs in the content area also update, according to the current selection, as indicated by rows 508s-x. The program "XFL Football" is selected, with the HUD 504 appropriately updated. Although there may be various other techniques for populating the content guide to reflect a selection of a remote DVR in the unit identification area 510, one is to directly access the information found in the components of the NDGMM 400 of the remote DVR to locally compile the content guide in the same fashion used to do so locally. Alternatively, the local DVR may simply poll the remote DVR to have the guide sent over as a "snapshot" that takes the form of a binary file that is read in conventional fashion. In either case, the content guide would be prepared to have the same apparent functionality as the local guide. That is, the commands for navigating to and selecting a program for playback, etc. would be the same. However, the selection of a program for playback from a remote guide prompts a read operation that is carried out over the network, wherein the program is read from the storage device of the remote DVR. The read operation is begun from the beginning of the program or at another point as discussed below. The read operation is made by accessing the hard disk of the remote DVR using the same types of commands used to access the content from the local DVR. Preferably, the reads are implemented using HTTP, but any number of alternatives may be provided including NFS.

Although various alternatives can be provided, the various DVRs can be organized into a logical directory with corresponding read operations being pathed according to the defined directory structure. The invention is not limited to any particular type of directory structure. Examples of implementations include a "transparent" system that mounts the remote directory system locally such that files appear as though they are among any other set of files on the local file system, and an "opaque" system wherein a unit requests bytes from a file on a remote system without needing to know anything about the remote system.

Where the guide of a remote DVR is accessed, it will be periodically refreshed to update possible changes occurring by a remote DVR operator, etc. A periodic (e.g., every 5 minute) refresh rate, or user selectable refresh rate can be implemented. Various alternatives can be provided, including one that automatically notifies each remote DVR in the network any time a change is made on the local DVR.

Figure 5E:
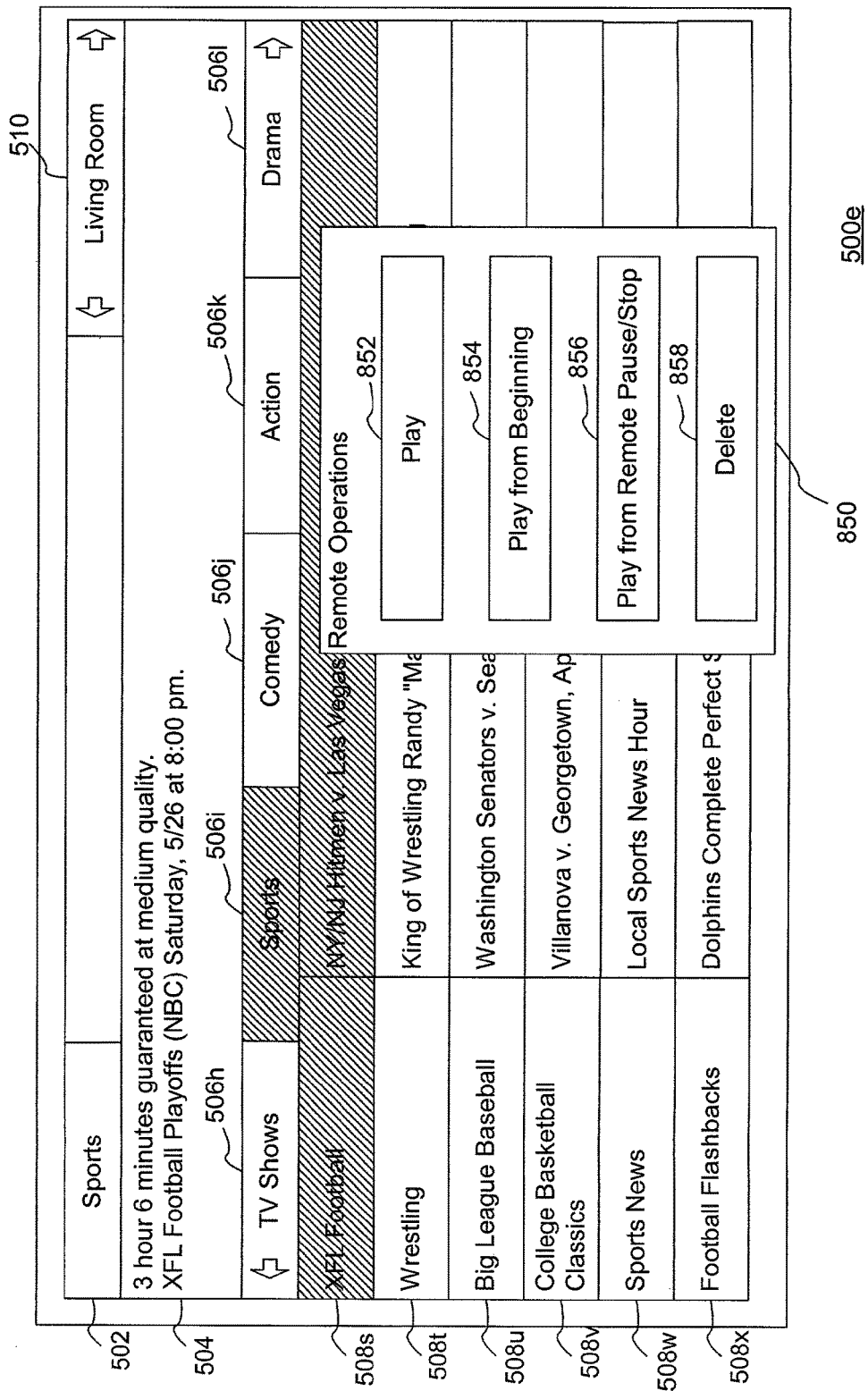

FIG. 5E is a display diagram illustrating the content guide 500d of FIG. 5D updated to have an overlaying remote operations screen 850. The remote operations screen 850 pops up upon receipt of any appropriate remote control or other command that is received while a program is selected and the current DVR according to the unit identification area 510 is not the local DVR. The remote operations screen 850 includes the buttons "Play" 852, "Play from Beginning" 854, "Play from Remote Pause/Stop" 856, and Delete 858.

The "Play" operation identifies the program, retrieves the pointer identifying a viewing termination point corresponding to the local DVR, and begins playback of the program from that location. The "Play from Beginning" operation identifies the program and begins playback from the beginning of the program. The "Play from Remote Pause/Stop" operation displays another menu containing the names of relevant DVRs on the network (those having a viewing location corresponding to the program). It may also indicate times corresponding to the pause/stop operation for each DVR. A selection from this menu retrieves the appropriate pointer corresponding to the viewing termination point (pause/stop) from the selected DVR, and begins a resumed playback of the program from that point. Other buttons may also be included if the operations screen is a generic operations screen for local and remote operations. For example, the button "Play from Local Pause/Stop" could be added. Alternatively, a "Play from Pause/Stop" button could list both local and remote information. Finally, the delete operation deletes the identified program from the remote unit's hard disk.

The invention is not limited to the provided. For example, a "Play From Last Viewed On" button could substitute for the "Play from Remote Pause/Stop" series of buttons, but have the described functionality.

Figure 6A:
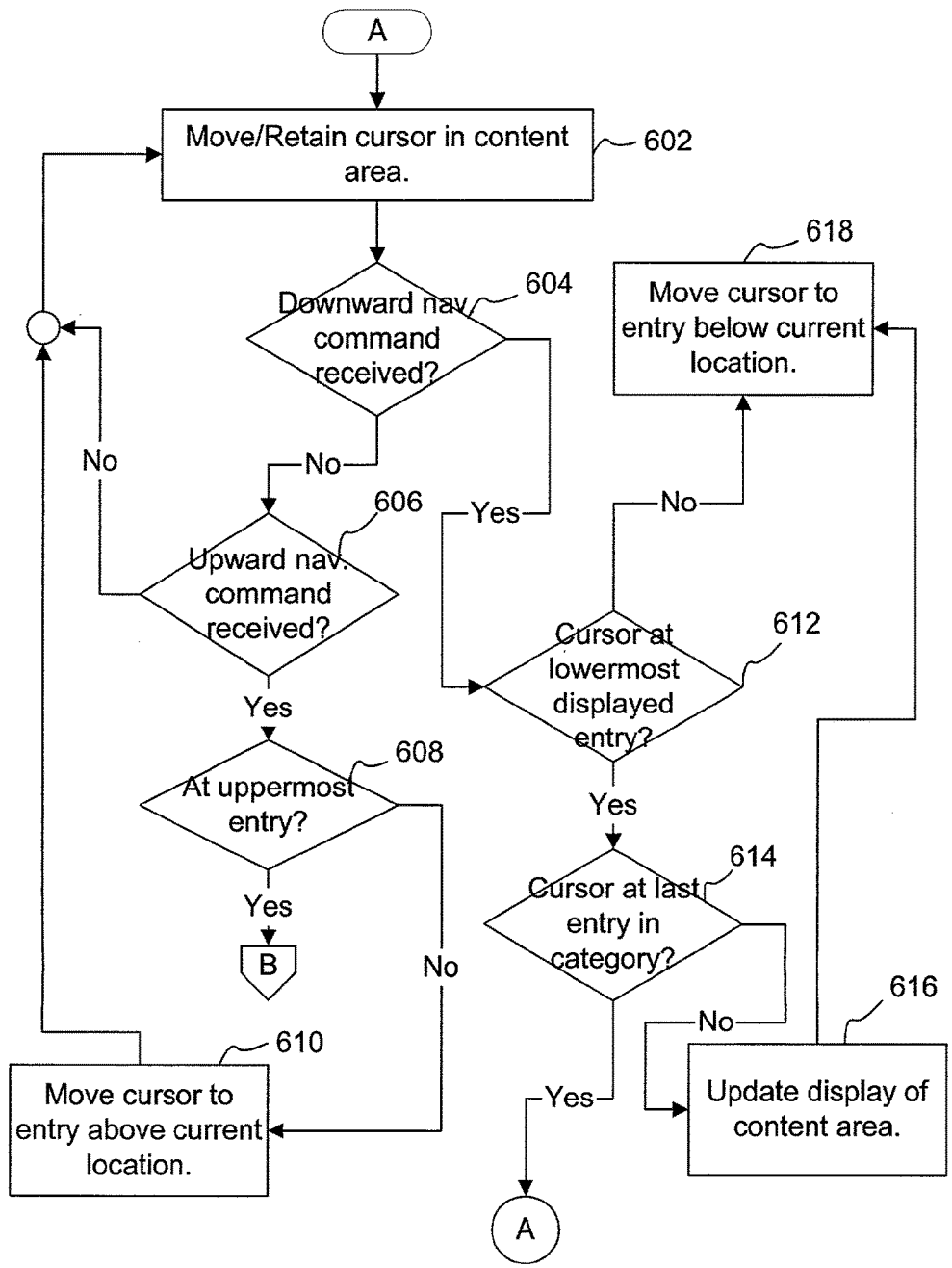
FIGS. 6A and 6B are flow diagrams illustrating an embodiment of navigating a content guide in accordance with the present invention.
Figure 6B:
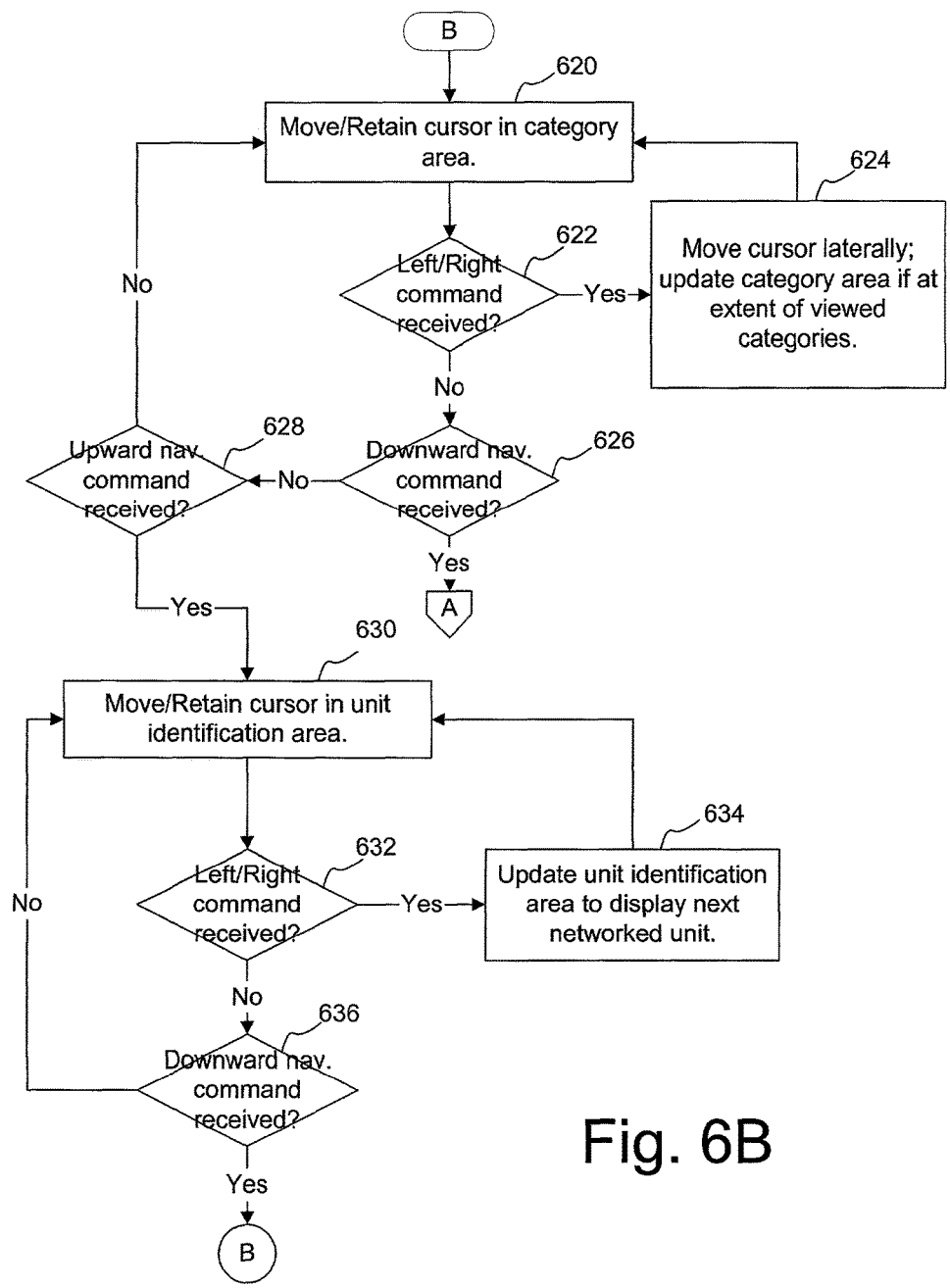

The flow diagrams of FIGS. 6A-6B illustrate an embodiment of navigating a content guide in accordance with the present invention. The content guide is instantiated using conventional signals, such as pressing an appropriate guide button on a remote control, or navigating to the guide from a main menu of operations. Upon entry into the content guide, the cursor resides 602 in the content area. Directional navigation then prompts movement of a cursor among the entries in the content area, or to other display areas as follows. Preferably the cursor is presented in the form of highlighting a current selection. For example, when the cursor is brought over a program in the content area, that program is shown in a color that differs from the remaining listed programs. The artisan will recognize the various alternative visual indicators.

Upon receipt 604 of a downward navigational command (e.g., a down arrow on a remote control), the NDGMM determines 612 whether the cursor is at the lowermost entry in the display and 614 whether it resides in the last entry in the entire listing for the category. If it is not at the lowermost displayed entry, then the cursor is moved 618 to the entry below the current location. If it is the lowest displayed entry but not the lowest in the category, the content area display is updated 616 to reveal at least one previously un-displayed program below the lowermost listing, and the cursor is moved 618 to the entry below its location. If the cursor is at the last entry in the category 614, then a no-operation is effectively encountered, and the cursor is merely retained 602 in the same position within the content area;

If it is determined 606 that an upward navigational command has been received, and that the cursor does not reside at the uppermost entry in the content area (608), then the cursor is moved to the entry above its current location and is retained 602 in the content area. If the upward command is received where it is determined 608 that the cursor resides at the uppermost entry in the content area, the cursor moves to the category area as illustrated in FIG. 6B.

Once the cursor resides in the category area, directional navigation in the lateral (left/right) direction moves the cursor among the available categories, and in the vertical direction moves the cursor to either the content area or the unit identification area as follows. Upon receipt 622 of a lateral (left/right) navigational command, the cursor is moved 624 laterally among the categories residing in the category area. Navigation of the cursor preferably highlights the current category, such as by showing it in a different color from the remaining categories. If the cursor previously resided at one of the displayed extents of the listed categories, the category display updates to reveal a new category. Thus, if the cursor resided at the rightmost category displayed in the category area, movement to the right would update the category area to display a new category that had previously been hidden from view (unless all of the available categories are displayable in the space provided by the category area). The content area preferably updates to list programs corresponding to a new category once the cursor is moved to its location. Alternatively, navigation of the cursor over a new category and receipt of a separate "select" command could be required to update the content area.

If it is determined 626 that a downward navigational command has been received, then the cursor moves to the content area for operations described in connection with FIG. 6A. If it is determined 628 that an upward navigational command has been received, then the cursor is moved 630 into the unit identification area. Determination 632 of a lateral (L/R) navigational command here causes the unit identification area to cycle to the next unit in the home network. Preferably this navigation also causes the remainder of the content guide to update according to the new selection. For example, if the user had been viewing the content guide for the bed room DVR and navigated to the unit identification area and gave a lateral navigational command to the living room DVR, the content guide would update to reflect available categories and program listings for the new (living room) DVR.

While in the unit identification area, determined receipt 636 of a downward navigational command prompts the cursor to move 620 into the category area with subsequent functionality as described above.

Figure 7:
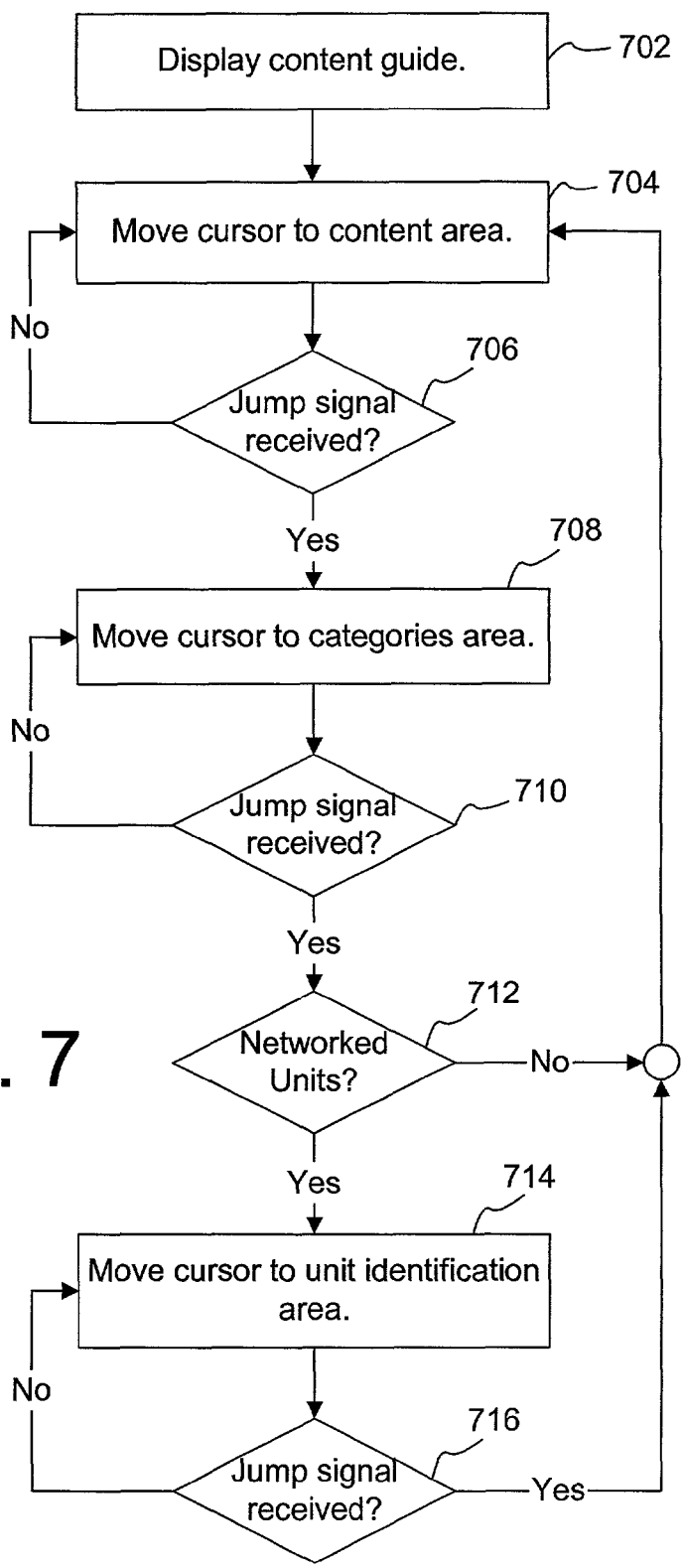
FIG. 7 is a flow diagram illustrating another embodiment of navigating a content guide in accordance with the present invention.

The flow diagram of FIG. 7 depicts another aspect of the present invention, wherein a common command facilitates immediate movement among the content display area, category area, and unit identification area.

Preferably, the content guide is activated through a main menu of DVR operations, or directly by pressing a "guide" button or the like. The content guide is then displayed 702 with the cursor residing 704 in the content area. Directional navigation can move the cursor among the program listings as described previously (not shown in FIG. 7). While the cursor resides in the content area, a determination 706 that a jump signal has been received automatically moves 708 the cursor into the category area, regardless of its location within the content area. Once in this region, directional navigation allows new categories to be selected, with corresponding updates of the content area. In this state, a determination 710 that a jump signal has been received causes the cursor to move 714 to the unit identification area if it is determined 712 that there are multiple units networked together, or moves 704 back to the content area if that is not the case. While the cursor resides in the unit identification area, lateral navigational commands cause the spinner found in that area to cycle among the available units and provide corresponding updates of the content and category areas. Here, a determination 716 that a jump signal has been received causes the cursor to move 704 to the content area. Various alternatives can be provided. For example, "shortcuts" that are prompted by merely pressing an appropriate button on a remote control or menu can be used in lieu of navigating to the unit identification area and then providing a lateral navigational command. There, a first button or command could prompt a shift "to the left" and a second button or command a shift "to the right." These shortcut commands would still cause the unit identification area to update as prompted.

Figure 8A:
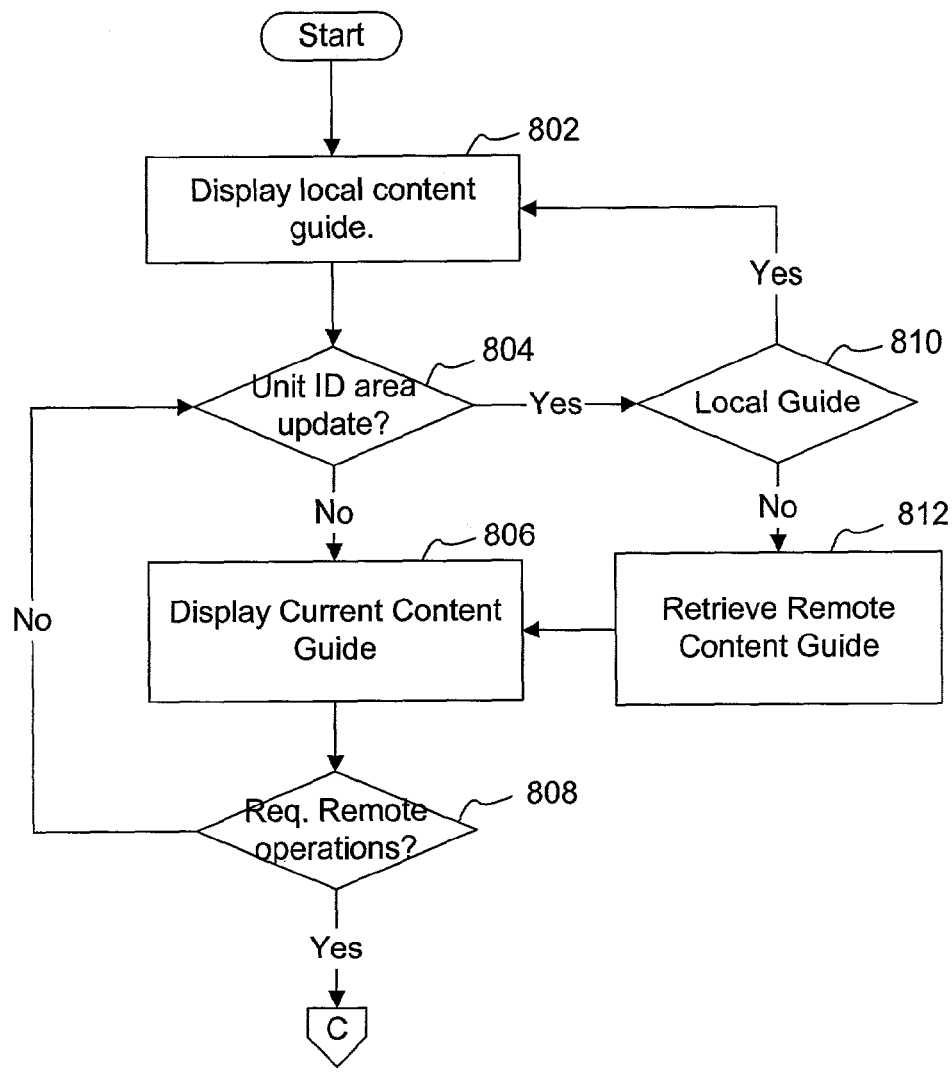
FIGS. 8A-B are flow diagrams illustrating an embodiment of accessing programs among networked devices in accordance with the present invention.
Figure 8B:
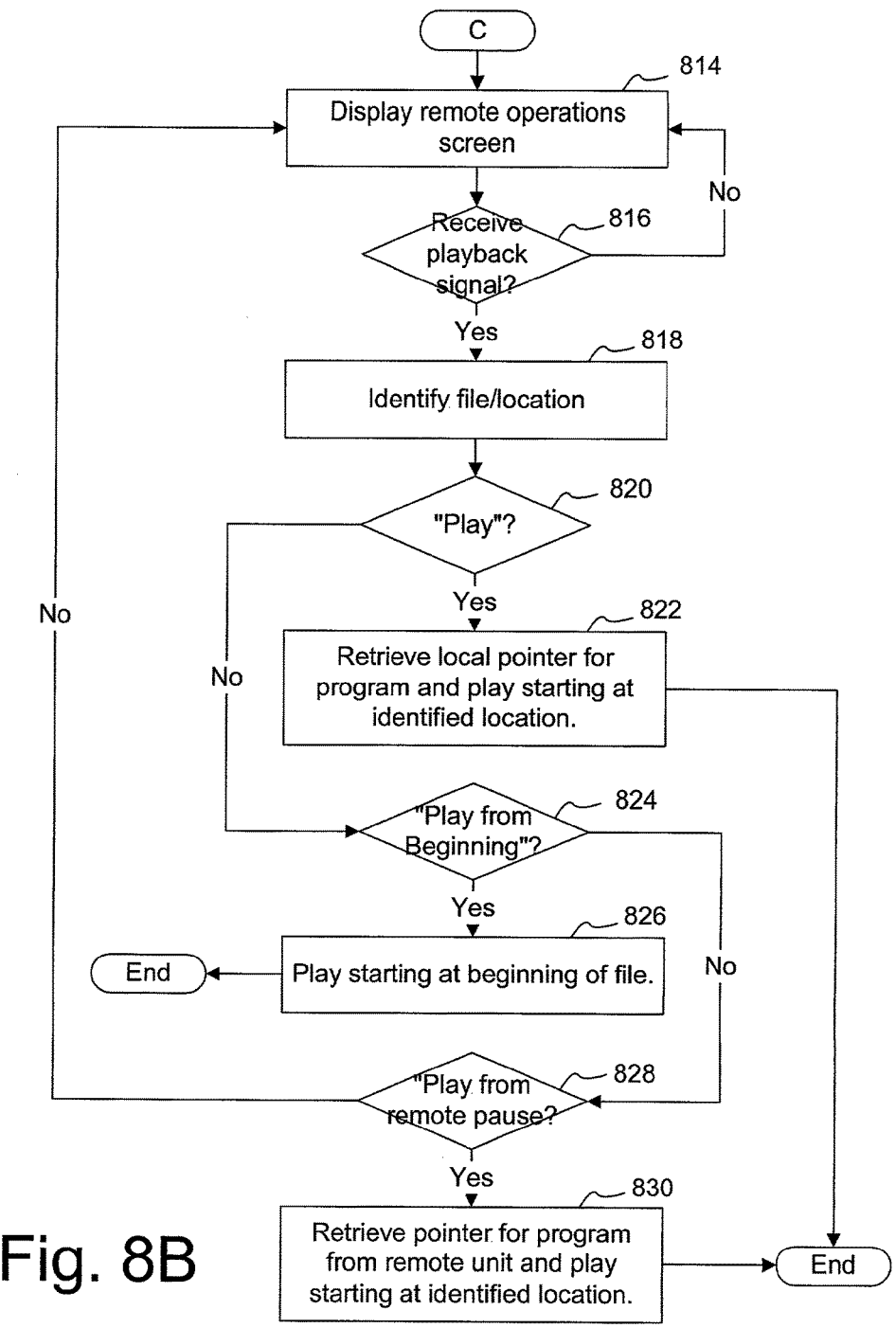

FIGS. 8A-8B are flow diagrams illustrating an embodiment of accessing programs among networked devices in accordance with the present invention. Initially, the local content guide is displayed 802 and may be operated as described above. If it is determined 804 that the unit identification area has been updated and that 810 that the update is not to the local guide, then the remote content guide is retrieved 812 and displayed 816, such as by retrieval of a guide snapshot or compilation of the guide as described above. Determination 808 of receipt of a request for remote operations, such as by receipt of a play command while a program in the remote guide is selected, the remote operations screen (FIG. 5D) is displayed 914, preferably as a pop up display overlaying the content guide, as shown in FIG. 5B. In addition to the delete command, whose operation is not shown in FIG. 8B for ease of discussion, the remote playback operations include "Play," "Play from Beginning," and "Play from Remote Pause/Stop." Upon determination 816 of receipt of a command for any of these playback operations, the file identifier for the program is retrieved 818, such as through its association to the entry in the content guide. Additional information, such as the location of the file according to a directory structure, may also be retrieved. Then, playback is commenced according to the specific playback operation. Where a Play command is found 820, the pointer corresponding to a termination of viewing in the local DVR is retrieved 822, and the file for the program is accessed with playback starting from the termination point. This option can default to playing the program from the beginning where no pointer is found in the local DVR. Where it is determined 824 that the command is "Play from Beginning," the file is accessed and played 826 from the beginning of the program. Finally, where it is determined 828 that the command is "Play from Remote Pause/Stop," the pointer corresponding to a termination of viewing from a remote DVR is retrieved 830 (preferably from the list of pointers maintained in the remote DVR) and the program is played from the point at which viewing was terminated at the remote unit. As described above, this allows a user to pause viewing from one of their DVRs and resume viewing from the pause spot using another DVR, such as one that is set up in a different room in their home. As an alternative, where it is determined that a program has been viewed from multiple DVRs and a play from pause type command is received, a listing of the DVRs from which the program had been viewed and the position in the program that the program had been paused (e.g., the list might indicate Living Room (20 m 15 s); Kids Room (10 m 03 s), with interfaces for selecting one of the two play start locations). Again, this is done by retrieving pointers indicating pause locations.

Some operations that are ordinarily used on stand-alone unit could be slightly modified for the networked DVR environment. For example, a DVR operator might be prevented from deleting a locally stored program if the program is currently being played by a remote DVR operator. Selections from stale guides of shows that had already been deleted will prompt routines informing the user that the show had been deleted. Selections of content from remote DVRs that have gone offline will prompt recognition of the lack of response and notification to the user that the content is unavailable because of the determined condition.

Where units are equipped to perform various tasks, such as simultaneously playing a program, recording a program and serving a program to another networked unit, various prioritization schemes can be implemented to determine which tasks will be performed at the expense of others. Preferably, recording a program is given highest preference, but various alternatives can be provided.

Thus, methods, apparatus and articles of manufacture for accessing programs using networked digital video recording devices are provided in accordance with the present invention. Although the present invention has been described in considerable detail with reference to certain preferred embodiments thereof, other embodiments are possible. Therefore, the spirit and scope of the appended claims should not be limited to the description of the preferred embodiments contained herein.

What is claimed is:

1. A device, comprising:
a processing system including a processor; and
a memory that stores executable instructions that, when executed by the processing system, facilitate performance of operations, comprising:
presenting, at a display device, a first content guide of first programs stored at the memory, wherein the first content guide includes a first unit identification area identifying the device and includes a first content area including a first list of the first programs stored at the memory;
detecting a first request to receive information associated with network video storage that is accessible via a network;
receiving a second content guide of second programs stored at the network video storage responsive to the first request associated with the network video storage;
presenting, at the display device, the second content guide of second programs stored at the network video storage, wherein the second content guide includes a second unit identification area identifying the network video storage and includes a second content area including a second list of the second programs stored at the network video storage;
receiving a snapshot file representing an update to the second content guide of second programs stored at the network video storage, wherein the update is generated by the network video storage upon a change in the second list of the second programs stored at the network video storage;
presenting an updated second content guide at the display device according to the snapshot file, wherein the network video storage comprises a digital video recorder accessible via a local area network;
detecting a second request to view a selected program from the updated second content guide;
receiving the selected program from the network video storage responsive to the second request;
presenting, at the display device, the selected program that is received from the network video storage;
pausing a presentation of the selected program in response to receiving a first user-generated input resulting in a paused presentation of the selected program;
storing the paused presentation of the selected program at the network video storage according to a pointer, wherein the pointer refers to corresponding to a number of seconds into the selected program the presentation was paused; and
presenting, at the display device, playback of the paused presentation of the selected program according to the pointer in response to receiving a second user-generated input, the presenting the playback of the paused presentation of the selected program includes retrieving the selected program from the network video and rapidly processing the selected program in background to resume the playback from the number of seconds into the selected program.

2. The device of claim 1, wherein the operations further comprise presenting an indicator associating a storage location of programs and a currently displayed content guide.

3. The device of claim 2, wherein the indicator includes user-programmable text.

4. The device of claim 1, wherein the operations further comprise requesting information from the network video storage to populate the second content guide.

5. The device of claim 1, wherein the operations further comprise retrieving viewing termination location identifiers from different snapshot files responsive to the second request to view the selected program, wherein the viewing termination location identifiers each identify a viewing termination location at which a prior viewing of the selected program was paused or stopped at a particular network video storage of a group of network video storages, wherein the snapshot files correspond to the group of network video storages.

6. The device of claim 5, wherein the selected program is received from the network video storage starting from the viewing termination location.

7. The device of claim 5, wherein the viewing termination location identifiers are determined by a pause or stop command received at the network video storage.

8. The device of claim 1, wherein the operations further comprise transmitting a command to the network video storage via the network to cause the network video storage to play the selected program.

9. The device of claim 1, wherein the network video storage is in a location that is remote from the device.

10. The device of claim 1, wherein the network video storage presents video via a second display device that is in a location that is remote from the display device.

11. A network video storage device, comprising a processing system including a processor; and
a memory that stores executable instructions that, when executed by the processing system, facilitate performance of operations, comprising:
receiving a first request for content information associated with content that is stored in the memory;
transmitting the content information to a digital video recorder via a wide area network connection responsive to the first request, wherein the digital video recorder presents, at a display device, a content guide of programs stored at the network video storage device according to the content information, wherein the content guide includes a unit identification area identifying the network video storage device and includes a content area including a list of the programs stored at the network video storage device;
receiving a second request for a selected program that is selected at the digital video recorder according to the content information; and responsive to the second request:
transmitting, via a snapshot file, a first viewing termination location identifier to the digital video recorder via the wide area network connection, wherein the first viewing termination location identifier identifies a first viewing termination location at which a first prior viewing of the selected program via the network video storage device was paused or stopped; wherein the digital video recorder aggregates the content guide based on the content information, and wherein a second viewing termination location is retrieved by the digital video recorder from another snapshot file that was received by the digital video recorder from another network video storage device; and transmitting the selected program to the digital video recorder via the wide area network connection, wherein the digital video recorder presents the selected program at the display device starting from one of the first viewing termination location or the second viewing termination location at which a second prior viewing of the selected program via the other network video storage device was paused or stopped, wherein the one of the first and second viewing termination locations is selected according to user input, wherein the selected program was stored at the network video storage device according to a pointer, wherein the pointer refers to corresponding to a number of seconds into the selected program according to one of the first viewing termination location or second viewing termination location;

wherein presenting a playback of the selected program includes processing the selected program in background to resume the playback from the number of seconds into the selected program.

12. The network video storage device of claim 11, wherein the operations further comprise transmitting an identifier to the digital video recorder, wherein the digital video recorder presents an indicator of a source of the content guide based on the identifier.

13. The network video storage device of claim 11, wherein the operations further comprise presenting video via a second display device that is in a location that is remote from the display device.

14. The network video storage device of claim 11, wherein the first viewing termination location identifier is determined by a pause or stop command received at the network video storage device.

15. A method, comprising:

receiving, by a processing system including processor, a first request for content information associated with content that is stored at a network video storage;

transmitting, by the processing system, the content information to a digital video recorder via a wide area network connection responsive to the first request, wherein the digital video recorder presents, at a display device, a content guide of programs stored at the network video storage according to the content information, wherein the content guide includes a unit identification area identifying the network video storage and includes a content area including a list of the programs stored at the network video storage;

receiving, by the processing system, a second request for a selected program that is selected at the digital video recorder according to the content information; and transmitting, via a snapshot file, a first viewing termination location identifier to the digital video recorder via the wide area network connection, wherein the first viewing termination location identifier identifies a first viewing termination location at which a first prior viewing of the selected program via the network video storage device was paused or stopped; wherein the digital video recorder aggregates the content guide based on the content information, and wherein a second viewing termination location is retrieved by the digital video recorder from another snapshot file that was received by the digital video recorder from another network video storage device; and transmitting, by the processing system, the selected program to the digital video recorder via the wide area network connection, wherein the digital video recorder presents the selected program at the display device starting from one of the first viewing termination location or the second viewing termination location, wherein the first viewing termination location is at a first point which a first prior viewing of the selected program via the network video storage was paused or stopped, wherein the second viewing termination location is at a second point which a second prior viewing of the selected program via another network video storage was paused or stopped, and wherein the one of the first and second viewing termination locations is selected according to user input, wherein the selected program was stored at the processing system according to a pointer, wherein the pointer refers to corresponding to a number of seconds into the selected program according to one of the first viewing termination location or second viewing termination location, wherein presenting a playback of the selected program includes processing the selected program in background to resume the playback from the number of seconds into the selected program.

16. The method of claim 15, further comprising transmitting a viewing termination location identifier to the digital video recorder via the wide area network connection, wherein the viewing termination location identifier identifies the first viewing termination location.

17. The method of claim 15, wherein the digital video recorder aggregates the content guide based on the content information, and wherein the second viewing termination location is transmitted from the another network video storage in the snapshot file.

18. The method of claim 17, further comprising transmitting an identifier to the digital video recorder, wherein the digital video recorder presents an indicator of a source of the content guide based on the identifier.

* * * * *